United States Patent
Bonningue

(10) Patent No.: US 6,655,556 B1
(45) Date of Patent: Dec. 2, 2003

(54) DISPENSING DEVICE INTENDED TO EQUIP A CONTAINER

(75) Inventor: Philippe Bonningue, Paris (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/664,053

(22) Filed: Sep. 18, 2000

(30) Foreign Application Priority Data

Sep. 16, 1999 (FR) .............................. 99 11581

(51) Int. Cl.[7] ................................. G01F 11/28
(52) U.S. Cl. ................... 222/386; 222/387; 222/438; 222/444
(58) Field of Search .................. 222/162, 386, 222/387, 438, 444

(56) References Cited

U.S. PATENT DOCUMENTS

| | | | | |
|---|---|---|---|---|
| 1,300,183 A | * | 4/1919 | McLaughlin | 222/320 |
| 2,885,121 A | * | 5/1959 | Litttleton | 222/162 |
| 3,759,425 A | * | 9/1973 | Lee | 222/309 |
| 3,786,966 A | * | 1/1974 | Behunin et al. | 222/387 |
| 4,966,468 A | * | 10/1990 | Bruning | 366/333 |
| 5,024,355 A | | 6/1991 | Jouillat et al. | 222/162 |
| 5,172,834 A | * | 12/1992 | Wang | 222/320 |

FOREIGN PATENT DOCUMENTS

| EP | 749691 | 5/1956 |
|---|---|---|
| EP | 0 011 487 | 5/1980 |
| EP | 0 312 474 | 4/1989 |

* cited by examiner

Primary Examiner—Joseph A. Kaufman
(74) Attorney, Agent, or Firm—Oliff & Berridge, PLC

(57) ABSTRACT

Dispensing device intended to equip a container, particularly a container containing a cosmetic product, comprises a base part and an assembly which can move with respect to the base part and defines therewith a variable volume pumping chamber. The assembly comprises a piston mobile between two extreme positions and a control member, secured to the piston, passing through the stationary base part and equipped with at least one outlet passage allowing the product to be dispensed. The piston comprises at least one intake passage allowing the pumping chamber to be filled. The control member is mobile with respect to the piston between a dispensing position and a filling position. The piston comprises a shut off for shutting off the outlet passage when the control member is in its filling position and/or the control member comprises a shut off for shutting off the intake passage, when the control member is in its dispensing position.

78 Claims, 4 Drawing Sheets

DISPENSING DEVICE INTENDED TO EQUIP A CONTAINER

BACKGROUND OF THE INVENTION

1. Field of the Invention

The present invention relates to a dispensing device intended to equip a container, especially a container containing a cosmetic product, comprising a base part and a mobile assembly which can move with respect to this base part and defines therewith a variable-volume pumping chamber.

2. Description of Related Art

European Patent Application EP-A-0 011 487 discloses a device of this type, in which the mobile assembly comprises a piston mobile between two extreme positions and a control member, this control member being secured to the piston and passing through the base part and being equipped with an outlet passage allowing the product contained in the pumping chamber to be dispensed, the piston comprising at least one intake passage allowing the pumping chamber to be filled, the control member being mobile with respect to the piston between a dispensing position and a filling position, the piston comprising shut-off means for shutting off the outlet passage, these shut-off means being suitable for shutting off this passage when the control member is in its filling position and/or the control member comprising shut-off means for shutting off the intake passage, these shut-off means being suitable for shutting off this passage when the control member is in its dispensing position, the control member comprising a first drive means designed so as to collaborate with the piston when the control member is in its dispensing position, so as to drive it along in a direction corresponding to a reduction in the volume of the pumping chamber, the control member comprising a second drive means designed so as to collaborate with the piston when the control member is in its filling position, so as to drive it along in a direction corresponding to an increase in the volume of the pumping chamber.

In this known device, the piston slides with a high friction with respect to the base part, which tends to lead to a rapid wear and makes the manipulation of the device relatively difficult.

SUMMARY OF THE INVENTION

The invention aims to further enhance a device of the aforementioned type.

It succeeds by virtue of the fact that the base part is designed so as to create a friction between the piston and the base part when the volume of the pumping chamber is minimum, and an absence of friction or smaller friction when the piston is in an intermediate position between its extreme positions.

By virtue of the invention, the friction is sufficient between the piston and the base part at the end of the dispensing of a product dose so that the control member is able to move with respect to the piston and reach the filling position.

In addition, the piston may move without friction on the base part or with a smaller friction during the filling of the pumping chamber, which decreases the wear of the components and facilitates the manipulation of the control member.

In one preferred embodiment of the invention, the base part is designed so as to create a friction between the piston and the base part when the volume of the pumping chamber is maximum and an absence of friction between the piston and the base part when the piston is in an intermediate position between its extreme positions.

In one preferred embodiment, the base part comprises at least a first portion with an inside diameter smaller than or equal to the outside diameter of the piston and a second portion with a diameter greater than the diameter of the piston, the first portion contacting the piston when the volume of the pumping chamber is minimum.

In one particular embodiment, the base part comprises a third portion with a diameter smaller than or equal to the diameter of the piston, and contacting the piston when the volume of the pumping chamber is maximum.

Again in one particular embodiment, the axial dimension of the first and third portions of the base part is smaller than or equal to twice the axial dimension of the piston.

Thus, the major part of the displacement of the piston may be achieved without friction with the base part.

The dispensing device of the invention has a low number of elements, is inexpensive to manufacture, and operates reliably.

Advantageously, the piston comprises shut-off means for shutting off the outlet passage, these shut-off means being suitable for shutting off this passage when the control member is in its filling position, and the control member comprises shut off means for shutting off the intake passage, these shut-off means being suitable for shutting off this passage when the control member is in its dispensing position.

As a variant, the piston comprises shut off means for shutting off the outlet passage, these shut-off means being suitable for shutting off this passage when the control member is in its filling position, and shut-off means for shutting off the intake passage.

As another variant, the control member comprises shut-off means for shutting off the intake passage, these shut-off means being suitable for shutting off this passage when the control member is in its dispensing position, and shut-off means for shutting off the outlet passage.

In one particular embodiment, the shut-off means for shutting off the intake passage act as the first drive means.

In one particular embodiment, the piston consists of a disc provided with a central aperture for the passage of the control member and with filling orifices distributed around this central aperture, these orifices constituting the intake passage.

In one particular embodiment, the control member comprises a control rod extending, at one end, out of the base part and equipped, at this end, with an element for grasping and with a product outlet orifice.

In one particular embodiment, the control rod comprises, at its opposite end, having passed through the piston, a plate suitable for shutting off the intake passage in the piston when the control member is in its dispensing position.

In one particular embodiment, the plate has openings encouraging product to flow towards the intake passage in the piston.

In one particular embodiment, the second drive means consists of a stop formed on the control rod.

In one particular embodiment, the outlet passage opens via a radial orifice onto the control rod between the first and second drive means and the shut-off means for shutting off the outlet passage consists of a cylindrical surface of the central aperture of the piston, said cylindrical surface having a height shorter than the distance separating said radial orifice and the first drive means and a height greater than the distance separating said radial orifice and the second drive means.

In one particular embodiment, the base part is shaped to increase the friction of the piston on the base part when the volume of the pumping chamber is minimum or maximum.

In one particular embodiment, the base part is designed so as to be fixed onto the neck of the container.

Another subject of the invention is a container equipped with a dispensing device as defined hereinabove.

A further subject of the invention is the use of a container such as the aforementioned, head down.

BRIEF DESCRIPTION OF THE DRAWINGS

The invention will be more clearly understood on reading the following detailed description, of one non-limiting embodiment and on examining the appended drawing, in which.

DETAILED DESCRIPTION OF PREFERRED EMBODIMENTS

Figure 1:
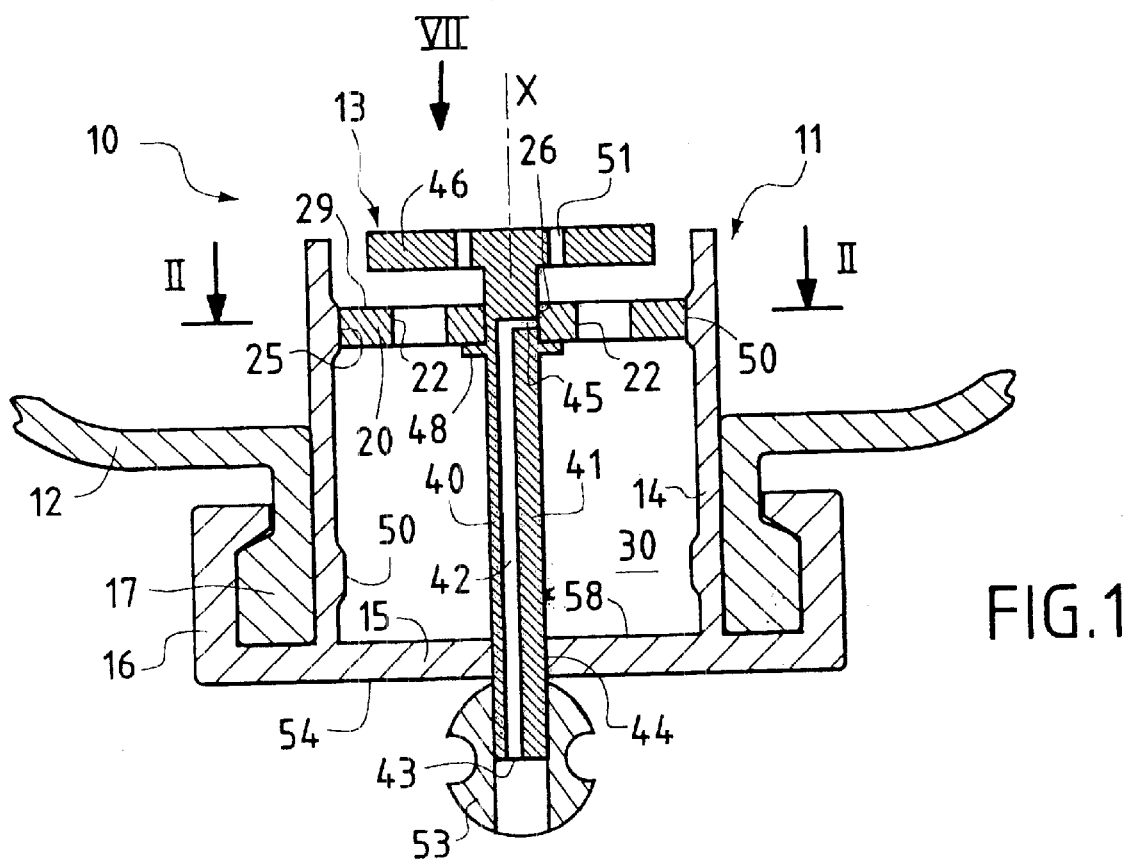
FIG. 1 is a schematic view in axial section of a dispensing device according to the invention.

The dispensing device or pump 10 depicted in the figures comprises a base part 11 secured to a container 12 and a mobile assembly 13 which can be moved with respect to the base part 11, as will be specified later on.

The base part 11 comprises a tubular skirt 14 of axis X, closed at its lower end by an end wall 15, this end wall 15 being continued radially out from the tubular skirt 14 by an annular rim 16 shaped to snap-fasten onto the neck 17 of the container 12.

In the exemplary embodiment described, the container 12 is intended to be used head down.

The tubular skirt 14 seals the neck 17 of the container closed.

The mobile assembly 13 comprises a piston 20 and a control member 40.

In the exemplary embodiment described, the piston 20 is in the form of a disc with an outside diameter similar to the inside diameter of the tubular skirt 14, and through the centre of which there passes a central aperture 21.

The piston 20 also has passing through it filling orifices 22 which are distributed around this central aperture 21.

Figure 2:
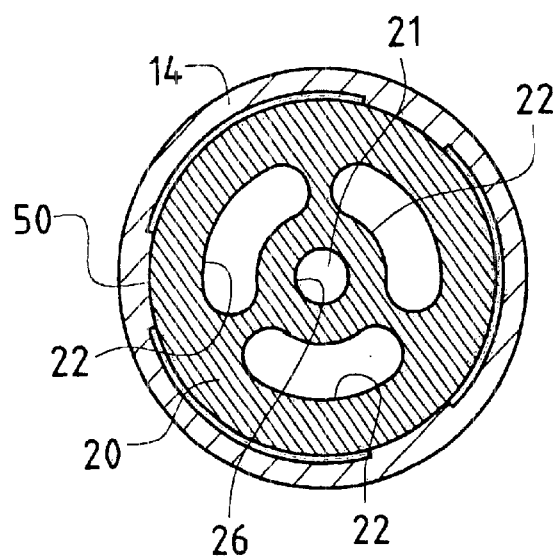
FIG. 2 is a section of the base part and of the piston taken on cutting line II—II of FIG. 1, FIGS. 3 to 6 illustrate the operation of the device.

The filling orifices 22 have a kidney bean cross section, as can be seen in FIG. 2.

The piston 20 defines, inside the tubular skirt 14, with the end wall 15, a pumping chamber 30, the volume of which depends on the axial position of the piston 20 relative to the base part 11.

The control member 40 comprises a control rod 41 of axis X, internally equipped with a duct 42.

The control rod 41 passes through the end wall 15 via an opening 44 and passes through the central aperture 21 of the piston 20.

The duct 42 opens, on the one side, at the lower end of the control rod 41, via an axial orifice 43 and, on the other side, a certain distance away from the upper end of the control rod 41, via a radial orifice 45.

The control rod 41 is secured at its upper end to a flat plate 46.

This flat plate 46 runs at right angles to the axis X.

The outside diameter of the plate 46 is chosen so as to allow it to cover the filling orifices 22, as will be explained later on.

The control rod 41 comprises a stop 48 located under the radial orifice 45.

Figure 3:
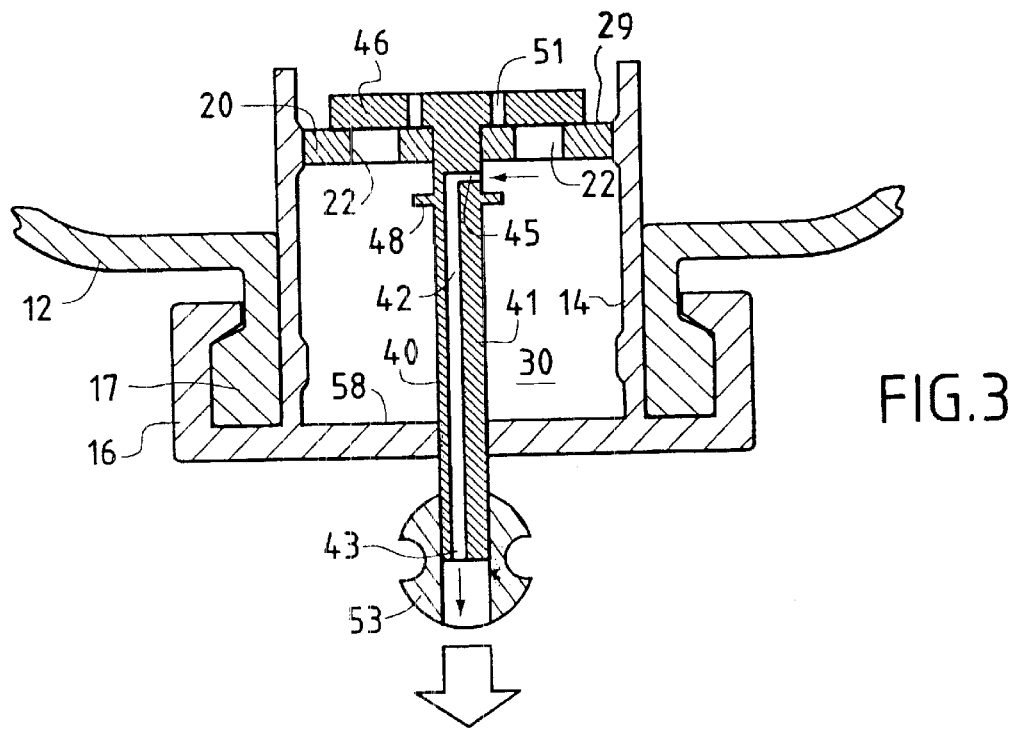

The separation between the radial orifice 45 and the plate 46 is greater than the thickness of the piston 20, which means that the control rod 41 can be moved relative to the piston 20 between a filling position depicted in FIG. 1, in which the piston 20 rests against the stop 48 via its underside 25 and, with the cylindrical surface 26, shuts off the central aperture 21 of the radial orifice 45, and a dispensing position depicted in FIG. 3, in which the piston 20 rests via its top side 29, against the plate 46.

The separation between the stop 48 and the plate 46 is greater than the thickness of the piston 20 and chosen such that when the piston 20 rests against the plate 46, the radial orifice 45 is uncovered, as can be seen in FIG. 3.

Figure 4:
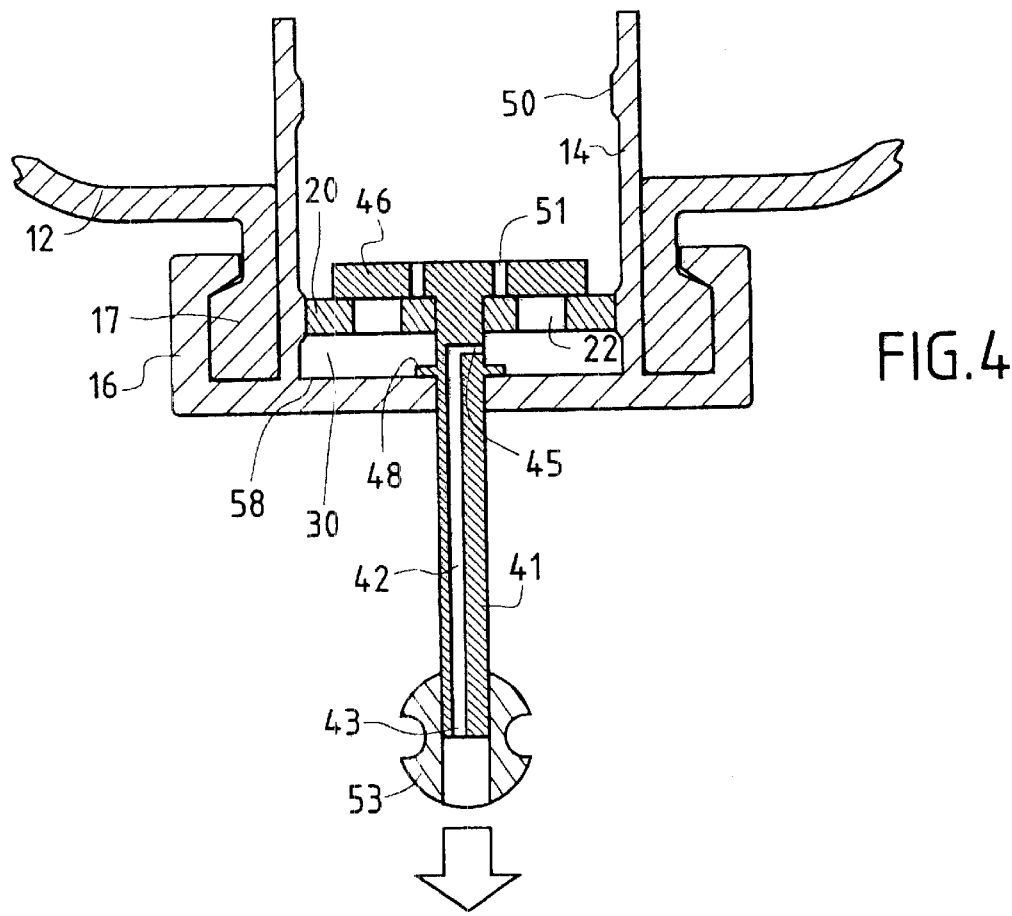

On its interior surface the tubular skirt 14 has slight reliefs 50 designed so as to increase the friction of the piston 20 on the tubular skirt 14 when the piston 20 is in the position of FIG. 1 corresponding to the volume of the pumping chamber being maximum or when the piston is in the position of FIG. 4, corresponding to the volume of the pumping chamber 30 being minimum.

The plate 46 comprises openings 51 which are offset with respect to the filling orifices 22 and intended to encourage the product contained in the container 12 to flow towards the filling orifices 22 when the pumping chamber 30 is being filled.

Figure 7:
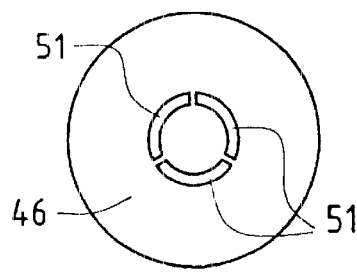
FIG. 7 is a view in the direction of arrow VII of FIG. 1, showing the plate of the mobile assembly separately.

The orifices 51 are kidney bean shaped, as can be seen in FIG. 7.

The control rod 41 is secured at its lower end to a dispensing attachment 53 which also constitutes a member for grasping.

The upwards travel of the control rod 41 is limited by this attachment 53 coming to rest against the underside 54 of the end wall 15.

The way in which the dispensing device works is as follows.

Let us assume that the pumping chamber 30 is full of product and that the piston 20 is in the raised position.

To dispense some product, the user pulls on the dispensing attachment 53, which drives the control rod 41 downwards.

As the friction of the piston 20 on the tubular skirt 14 is greater than the friction of the rod 41 through the piston 20, the control rod 41 begins to move relative to the piston 20, without the latter moving, until the plate 46 comes to rest against the top face 29 of the piston 20, as illustrated in FIG. 3.

From this moment onwards, the radial orifice 45 of the control rod 41 is uncovered and the filling orifices 22 in the piston 20 are shut off by the plate 46.

As the user continues to pull on the dispensing attachment 53, the control rod 41 drives the piston 20 downwards.

The volume of the pumping chamber 30 decreases and product flows through the duct 42 towards the outlet orifice 43.

The clearance there is between the piston 20 and the tubular skirt 14 is small enough for the product contained in the pumping chamber 30 to flow in preference through the duct 42 rather than through this clearance.

The downwards movement of the control rod 41 and of the piston 20 continues until the stop 48 comes to rest against the top face 58 of the end wall 15, as illustrated in FIG. 4.

In this position, the volume of the pumping chamber 30 is minimum.

Next, to refill the pumping chamber 30, the user pushes on the dispensing attachment 53.

Figure 5:
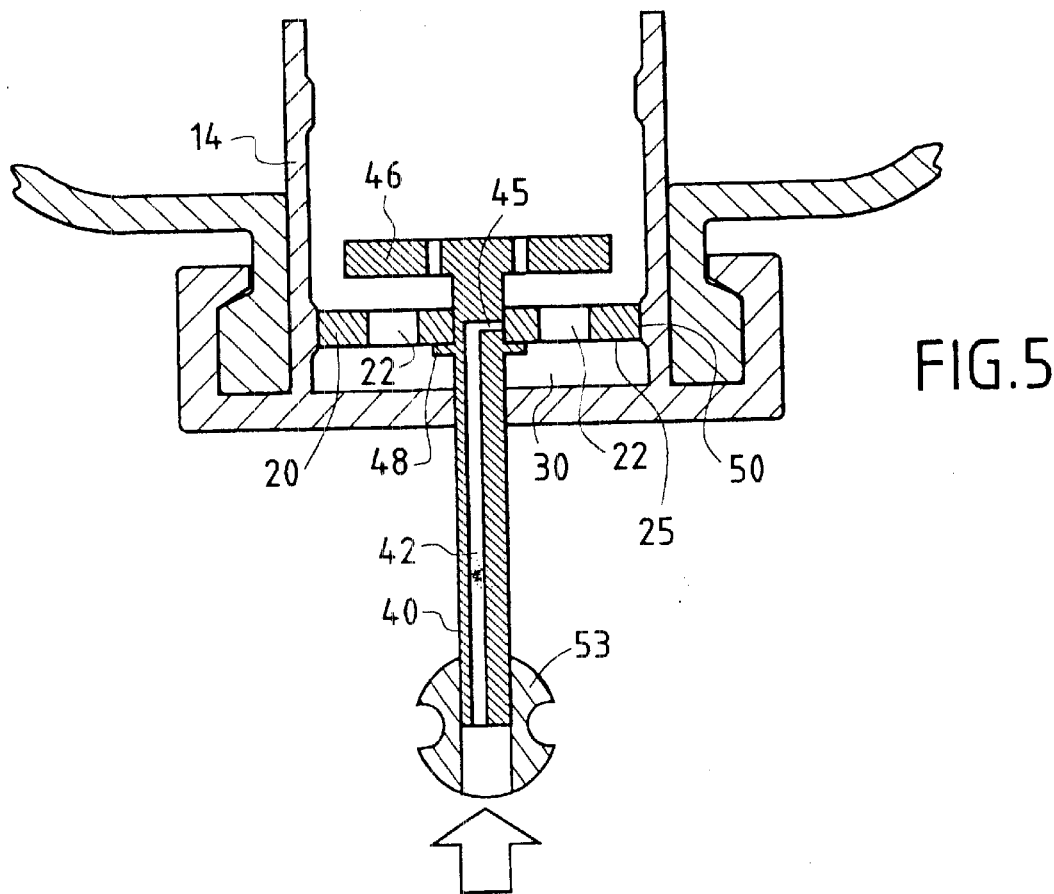

As the friction between the piston 20 and the tubular skirt 14 is greater than the friction between the piston 20 and the control rod 41, the latter begins to move relative to the piston 20 until the stop 48 comes to rest against the underside 25 of the piston 20, as illustrated in FIG. 5.

When the stop 48 is resting against the piston 20, the cylindrical surface 26 of the central aperture 21 in the piston shuts off the radial orifice 45 and the plate 46 has uncovered the filling orifices 22, as can be seen in FIG. 5.

As the control rod 41 continues to move back up, the stop 48 drives the piston 20 upwards.

Figure 6:
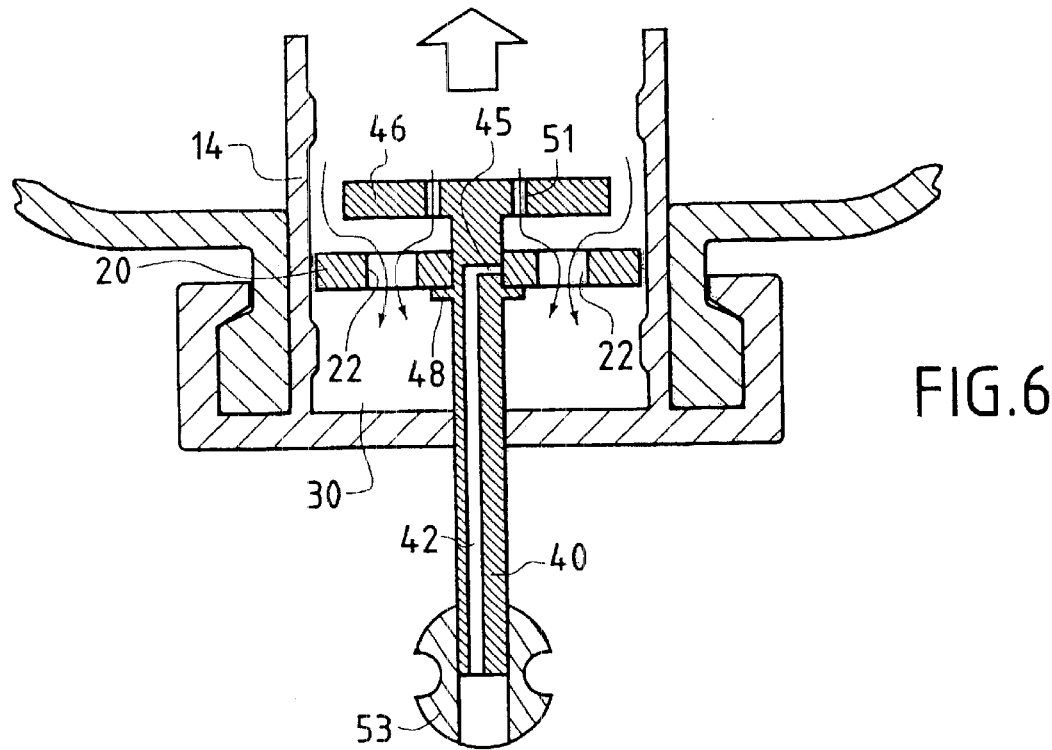

The volume of the pumping chamber 30 increases, and a depression is pulled therein, causing product to be drawn in from the container through the openings 51 and the filling orifices 22, as illustrated in FIG. 6.

Of course, the invention is not restricted to the exemplary form of embodiment described.

In particular, the shape of the piston and that of the control member can be altered according to the nature of the product and to the dose to be dispensed.

It is also possible to fit a helical return spring between the stop 48 and the top face 58 of the end wall 15.

In the exemplary form of embodiment of FIGS. 1 to 7, the relative movement of the control member and of the piston is put to use either to shut off the radial orifice 45 or to shut off the filling orifices 22.

It is possible, without departing from the scope of the invention, to make use of the relative movement of the control member and of the piston to fulfil just one of these two functions.

Figure 8:
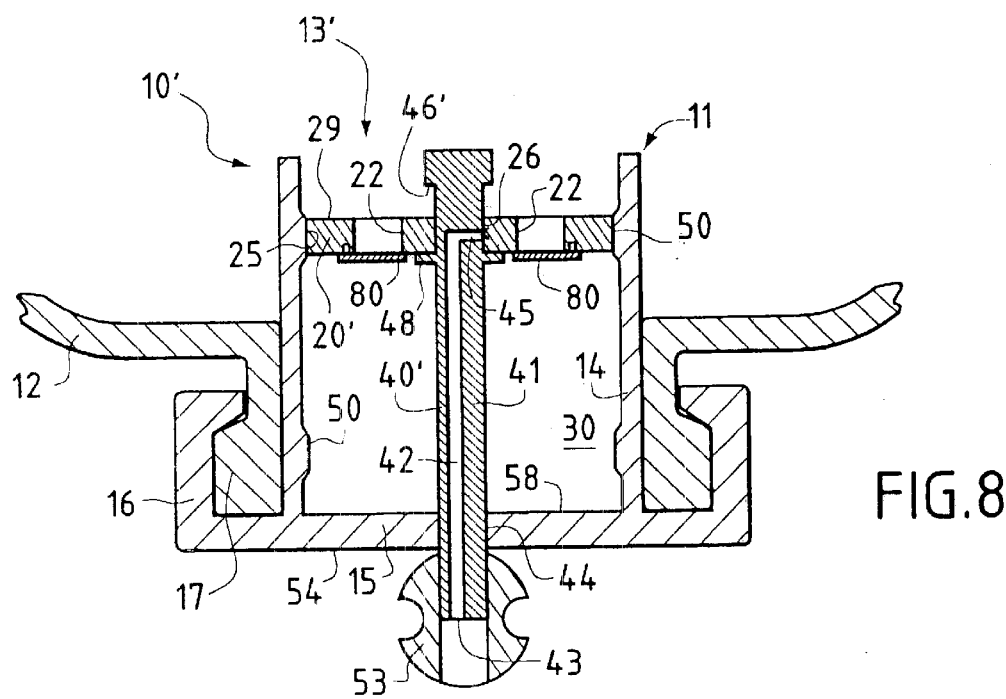
FIG. 8 is a section similar to FIG. 1, illustrating a first variant of embodiment.

By way of example, FIG. 8 depicts a first alternative form 10' in which the mobile assembly 13' comprises a control member 40' which differs from the control member 40 described previously through the absence of the plate 46 which is replaced by a simple shoulder 46' and a piston 20' which differs from the piston 20 described previously through the presence of valves 80 associated with the filling orifices 22 on the underside.

When the pumping chamber 30 is being filled, the valves 80 open.

When the user pulls on the control member 40', the shoulder 46' comes to rest against the piston 20' and drives the latter downwards.

The valves 80 then close to shut off the filling orifices 22.

The radial orifice 45 becomes uncovered to allow product to be dispensed.

Figure 9:
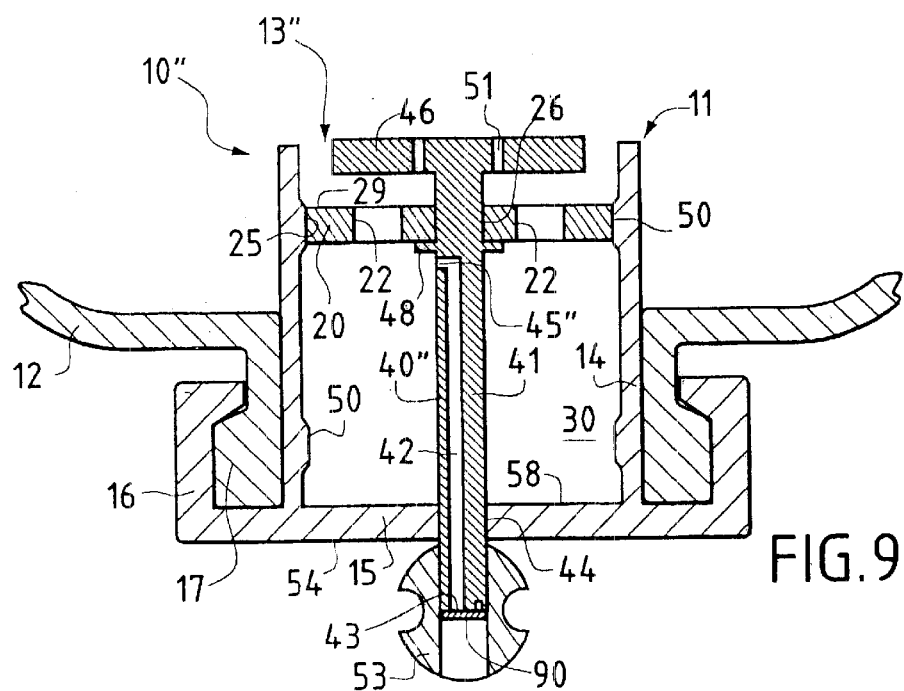
FIG. 9 is a section similar to FIG. 1, illustrating a second variant of embodiment.

FIG. 9 depicts a second alternative form 10" in which the mobile assembly 13" differs from the mobile assembly 13 in that the outlet passage of the control member 40" comprises a radial orifice 45" opening into the pumping chamber 30 before the stop 48 and in that a valve 90 is associated with the outlet orifice 43.

When the user pushes the control member 40" upwards, the valve 90 is closed.

The latter opens when the user pulls on the control member 40" to dispense with the product contained in the pumping chamber 30.

The valves 80 and 90 of the two alternative forms of embodiment which have just been described are advantageously made by overmoulding or by two-shot injection moulding in an elastomeric material.

What is claimed is:

1. A dispensing device, comprising:
   a stationary base part, and
   a mobile assembly which can move with respect to the base part and defines therewith a variable-volume pumping chamber, the mobile assembly comprising:
   a piston mobile between two extreme positions, the piston comprising:
      at least one intake passage allowing the pumping chamber to be filled, and
      a control member, secured to the piston, passing through the stationary base part and being equipped with at least one outlet passage allowing product contained in the pumping chamber to be dispensed, the control member being mobile with respect to the piston between a dispensing position and a filling position, the control member comprising:
         a first drive means configured so as to collaborate with the piston when the control member is in the dispensing position, so as to drive it along in a direction corresponding to a reduction in the volume of the pumping chamber, a second drive means configured so as to collaborate with the piston when the control member is in the filling position, so as to drive it along in a direction corresponding to an increase in the volume of the pumping chamber, wherein:

the piston comprises shut-off means for shutting off the outlet passage when the control member is in the filling position, and the control member comprises shut-off means for shutting off the intake passage when the control member is in the dispensing position, and wherein the base part is configured so as to create a friction between the piston and the base part when the volume of the pumping chamber is minimum, and an absence of friction or a smaller friction when the piston is in an intermediate position between the extreme positions.

2. Device according to claim 1, wherein the base part is configured so as to create a friction between the piston and the base part when the volume of the pumping chamber is maximum and an absence of friction between the piston and the base part when the piston is in an intermediate position between the extreme positions.

3. Device according to claim 1, wherein the base part comprises at least a first portion with an inside diameter smaller than or equal to the outside diameter of the piston and a second portion with a diameter greater than the diameter of the piston, the first portion contacting the piston when the volume of the pumping chamber is minimum.

4. Device according to claim 3, wherein the base part comprises a third portion with a diameter smaller than or equal to the diameter of the piston, and contacting the piston when the volume of the pumping chamber is maximum.

5. Device according to claim 4, wherein the axial dimension of the first and third portions of the base part, is smaller than or equal to twice the axial dimension of the piston.

6. Device according to claim 1, wherein the piston comprises means for shutting off the outlet passage when the control member is in the filling position, and means for shutting off the intake passage.

7. Device according to claim 1, wherein the control member comprises means for shutting off the intake passage when the control member is in the dispensing position, and means for shutting off the outlet passage.

8. Device according to claim 1, wherein the piston comprises means for shutting off the outlet passage when the control member is in the filling position, and the control member comprises means for shutting off the intake passage when the control member is in the dispensing position.

9. Device according to claim 1, wherein the means for shutting off the intake passage act as the first drive means.

10. Device according to claim 1, wherein the piston comprises a disc provided with a central aperture for the passage of the control member and with filling orifices distributed around the central aperture, the orifices defining the intake passage.

11. Device according to claim 1, wherein the control member comprises a control rod extending, at one end, out of the base part and equipped, at the one end, with an element for grasping and with a product outlet orifice.

12. Device according to claim 11, wherein the control rod comprises, at the opposite end, having passed through the piston, a flat plate capable of shutting off the intake passage when the control member is in the dispensing position.

13. Device according to claim 12, wherein the flat plate has openings encouraging product to flow towards the intake passage in the piston.

14. Device according to claim 11, wherein the second drive means comprises a stop formed on the control rod.

15. Device according to claim 11, wherein the outlet passage opens via a radial orifice onto the control rod between the first and second drive means and the means for shutting off the outlet passage comprises a cylindrical surface of the central aperture of the piston, the cylindrical surface having a height shorter than the distance separating the radial orifice and the first drive means and a height greater than the distance separating the radial orifice and the second drive means.

16. Device according to claim 1, wherein the base part is shaped to increase the friction of the piston on the base part when the volume of the pumping chamber is at its minimum or maximum.

17. Device according to claim 1, wherein the base part is configured to be fixed onto a neck of the container.

18. Container equipped with a dispensing device as defined in claim 1.

19. Device according to claim 1, wherein the container contains a cosmetic product.

20. A dispensing device comprising:

a stationary base part, and a mobile assembly which can move with respect to the base part and defines therewith a variable volume pumping chamber, the mobile assembly comprising:

a piston mobile between two extreme positions, the piston comprising:

at least one intake passage allowing the pumping chamber to be filled, and a control member secured to the piston, passing through the stationary base part and being equipped with at least one outlet passage allowing product contained in the pumping chamber to be dispensed, the control member being mobile with respect to the piston between a dispensing position and a filling position, the control member comprising:

a first drive means configured so as to collaborate with the piston when the control member is in the dispensing position, so as to drive it along in a direction corresponding to a reduction in the volume of the pumping chamber, a second drive means configured so as to collaborate with the piston when the control member is in the filling position, so as to drive it along in a direction corresponding to an increase in the volume of the pumping chamber, wherein the piston comprises shut-off means for shutting off the outlet passage when the control member is in the filling position, or the control member comprises shut-off means for shutting off the intake passage when the control member is in the dispensing position, and wherein the base part is configured so as to create a friction between the piston and the base part when the volume of the pumping chamber is minimum, and an absence of friction or a smaller friction when the piston is in an intermediate position between the extreme positions.

21. Device according to claim 20, wherein the base part is configured so as to create a friction between the piston and the base part when the volume of the pumping chamber is maximum and an absence of friction between the piston and the base part when the piston is in an intermediate position between its extreme positions.

22. Device according to claim 20, wherein the base part comprises at least a first portion with an inside diameter smaller than or equal to the outside diameter of the piston and a second portion with a diameter greater than the diameter of the piston, the first portion contacting the piston when the volume of the pumping chamber is minimum.

23. Device according to claim 22, wherein the base part comprises a third portion with a diameter smaller than or equal to the diameter of the piston, and contacting the piston when the volume of the pumping chamber is maximum.

24. Device according to claim 23, wherein the axial dimension of the first and third portions of the base part is smaller than or equal to twice the axial dimension of the piston.

25. Device according to claim 20, wherein the piston comprises means for shutting off the outlet passage when the control member is in the filling position, and means for shutting off the intake passage.

26. Device according to claim 20, wherein the control member comprises means for shutting off the intake passage when the control member is in the dispensing position, and means for shutting off the outlet passage.

27. Device according to claim 20, wherein the piston comprises means for shutting off the outlet passage when the control member is in the filling position, and the control member comprises means for shutting off the intake passage when the control member is in the dispensing position.

28. Device according to claim 20, wherein the means for shutting off the intake passage act as the first drive means.

29. Device according to claim 20, wherein the piston comprises a disc provided with a central aperture for the passage of the control member and with filling orifices distributed around this central aperture, these orifices defining the intake passage.

30. Device according to claim 20, wherein the control member comprises a control rod extending, at one end, out of the base part and equipped, at this end, with an element for grasping and with a product outlet orifice.

31. Device according to claim 30, wherein the control rod comprises, at the opposite end, having passed through the piston, a flat plate capable of shutting off the intake passage when the control member is in its dispensing position.

32. Device according to claim 31, wherein the flat plate has openings encouraging product to flow towards the intake passage in the piston.

33. Device according to claim 30, wherein the second drive means comprises a stop formed on the control rod.

34. Device according to claim 30, wherein the outlet passage opens via a radial orifice onto the control rod between the first and second drive means and the means for shutting off the outlet passage comprises a cylindrical surface of the central aperture of the piston, said cylindrical surface having a height shorter than the distance separating said radial orifice and the first drive means and a height greater than the distance separating said radial orifice and the second drive means.

35. Device according to claim 20, wherein the base part is shaped to increase the friction of the piston on the base part when the volume of the pumping chamber is at its minimum or maximum.

36. Device according to claim 20, wherein the base part is configured to be fixed onto a neck of the container.

37. Container equipped with a dispensing device as defined in claim 20.

38. Device according to claim 20, wherein the container contains a cosmetic product.

39. A dispensing device comprising:
a stationary base part, and
a mobile assembly which can move with respect to the base part and defines therewith a variable volume pumping chamber, the mobile assembly comprising:
a piston mobile between two extreme positions, comprising:
at least one intake passage allowing the pumping chamber to be filled, and
a control member secured to the piston, passing through the stationary base part and being equipped with at least one outlet passage allowing product contained in the pumping chamber to be dispensed, the control member being mobile with respect to the piston between a dispensing position and a filling position, the control member comprising:
a first drive element configured so as to collaborate with the piston when the control member is in the dispensing position, so as to drive it along in a direction corresponding to a reduction in the volume of the pumping chamber,
a second drive element configured so as to collaborate with the piston when the control member is in its filling position, so as to drive it along in a direction corresponding to an increase in the volume of the pumping chamber, wherein
the piston is configured for shutting off the outlet passage, when the control member is in its filling position, and
the control member is configured for shutting off the intake passage when the control member is in its dispensing position, and
wherein the base part is configured so as to create a friction between the piston and the base part when the volume of the pumping chamber is minimum, and an absence of friction or a smaller friction when the piston is in an intermediate position between the extreme positions.

40. Device according to claim 39, wherein the base part is configured so as to create a friction between the piston and the base part when the volume of the pumping chamber is maximum and an absence of friction between the piston and the base part when the piston is in an intermediate position between the extreme positions.

41. Device according to claim 39, wherein the base part comprises at least a first portion with an inside diameter smaller than or equal to the outside diameter of the piston and a second portion with a diameter greater than the diameter of the piston, the first portion contacting the piston when the volume of the pumping chamber is minimum.

42. Device according to claim 41, wherein the base part comprises a third portion with a diameter smaller than or equal to the diameter of the piston, and contacting the piston when the volume of the pumping chamber is maximum.

43. Device according to claim 42, wherein the axial dimension of the first and third portions of the base part is smaller than or equal to twice the axial dimension of the piston.

44. Device according to claim 39, wherein the piston is configured for shutting off the outlet passage when the control member is in its filling position, and for shutting off the intake passage.

45. Device according to claim 39, wherein the control member is configured for shutting off the intake passage when the control member is in its dispensing position, and for shutting off the outlet passage.

46. Device according to claim 39, wherein the piston is configured for shutting off the outlet passage when the control member is in its filling position, and for shutting off the intake passage when the control member is in its dispensing position.

47. Device according to claim 39, wherein the first drive element is configured for shutting off the intake passage.

48. Device according to claim 47, wherein the outlet passage opens via a radial orifice onto the control rod between the first and second drive elements and wherein the central aperture has a cylindrical surface for shutting off the outlet passage, said cylindrical surface having a height shorter than the distance separating said radial orifice and the first drive element and a height greater than the distance separating said radial orifice and the second drive element.

49. Device according to claim 39, wherein the piston comprises a disc provided with a central aperture for the passage of the control member and with filling orifices distributed around this central aperture, these orifices defining the intake passage.

50. Device according to claim 49, wherein the outlet passage opens via a radial orifice onto the control rod between the first and second drive elements and wherein the central aperture has a cylindrical surface for shutting off the outlet passage, said cylindrical surface having a height shorter than the distance separating said radial orifice and the first drive element and a height greater than the distance separating said radial orifice and the second drive element.

51. Device according to claim 39, wherein the control member comprises a control rod extending, at one end, out of the base part and equipped, at this end, with an element for grasping and with a product outlet orifice.

52. Device according to claim 51, wherein the second drive element comprises a stop formed on the control rod.

53. Device according to claim 39, wherein the control rod comprises, at its opposite end, having passed through the piston, a flat plate capable of shutting off the intake passage when the control member is in its dispensing position.

54. Device according to claim 53, wherein the flat plate has openings encouraging product to flow towards the intake passage in the piston.

55. Device according to claim 39, wherein the base part is shaped to increase the friction of the piston on the base part when the volume of the pumping chamber is at its minimum or maximum.

56. Device according to claim 39, wherein the base part is configured to be fixed onto a neck of the container.

57. Container equipped with a dispensing device as defined in claim 39.

58. Device according to claim 39, wherein the container contains a cosmetic product.

59. A dispensing device comprising:
a stationary base part, and
a mobile assembly which can move with respect to the base part and defines therewith a variable volume pumping chamber, the mobile assembly comprising:
a piston mobile between two extreme positions, comprising:
at least one intake passage allowing the pumping chamber to be filled, and
a control member secured to the piston, passing through the stationary base part and being equipped with at least one outlet passage allowing product contained in the pumping chamber to be dispensed, the control member being mobile with respect to the piston between a dispensing position and a filling position, the control member comprising:
a first drive element configured so as to collaborate with the piston when the control member is in the dispensing position, so as to drive it along in a direction corresponding to a reduction in the volume of the pumping chamber,
a second drive element configured so as to collaborate with the piston when the control member is in its filling position, so as to drive it along in a direction corresponding to an increase in the volume of the pumping chamber, wherein
the piston is configured for shutting off the outlet passage, when the control member is in its filling position, or
the control member is configured for shutting off the intake passage when the control member is in its dispensing position, and
wherein the base part is configured so as to create a friction between the piston and the base part when the volume of the pumping chamber is minimum, and an absence of friction or a smaller friction when the piston is in an intermediate position between the extreme positions.

60. Device according to claim 59, wherein the base part is configured so as to create a friction between the piston and the base part when the volume of the pumping chamber is maximum and an absence of friction between the piston and the base part when the piston is in an intermediate position between the extreme positions.

61. Device according to claim 59, wherein the base part comprises at least a first portion with an inside diameter smaller than or equal to the outside diameter of the piston and a second portion with a diameter greater than the diameter of the piston, the first portion contacting the piston when the volume of the pumping chamber is minimum.

62. Device according to claim 61, wherein the base part comprises a third portion with a diameter smaller than or equal to the diameter of the piston, and contacting the piston when the volume of the pumping chamber is maximum.

63. Device according to claim 62, wherein the axial dimension of the first and third portions of the base part is smaller than or equal to twice the axial dimension of the piston.

64. Device according to claim 59, wherein the piston is configured for shutting off the outlet passage when the control member is in its filling position, and for shutting off the intake passage.

65. Device according to claim 59, wherein the control member is configured for shutting off the intake passage when the control member is in its dispensing position, and for shutting off the outlet passage.

66. Device according to claim 59, wherein the piston is configured for shutting off the outlet passage when the control member is in its filling position, and for shutting off the intake passage when the control member is in its dispensing position.

67. Device according to claim 59, wherein the first drive element is configured for shutting off the intake passage.

68. Device according to claim 59, wherein the piston comprises a disc provided with a central aperture for the passage of the control member and with filling orifices distributed around this central aperture, these orifices defining the intake passage.

69. Device according to claim 68, wherein the outlet passage opens via a radial orifice onto the control rod between the first and second drive elements and wherein the central aperture has a cylindrical surface for shutting off the outlet passage, said cylindrical surface having a height shorter than the distance separating said radial orifice and the first drive element and a height greater than the distance separating said radial orifice and the second drive element.

70. Device according to claim 59, wherein the control member comprises a control rod extending, at one end, out of the base part and equipped, at this end, with an element for grasping and with a product outlet orifice.

71. Device according to claim 70, wherein the control rod comprises, at its opposite end, having passed through the piston, a flat plate capable of shutting off the intake passage when the control member is in its dispensing position.

72. Device according to claim 71, wherein the flat plate has openings encouraging product to flow towards the intake passage in the piston.

73. Device according to claim 70, wherein the second drive element comprises a stop formed on the control rod.

74. Device according to claim 70, wherein the outlet passage opens via a radial orifice onto the control rod between the first and second drive elements and wherein the central aperture has a cylindrical surface for shutting off the outlet passage, said cylindrical surface having a height shorter than the distance separating said radial orifice and the first drive element and a height greater than the distance separating said radial orifice and the second drive element.

75. Device according to claim 59, wherein the base part is shaped to increase the friction of the piston on the base part when the volume of the pumping chamber is at its minimum or maximum.

76. Device according to claim 59, wherein the base part is configured to be fixed onto a neck of the container.

77. Container equipped with a dispensing device as defined in claim 59.

78. Device according to claim 59, wherein the container contains a cosmetic product.

* * * * *